United States Patent [19]

Thomas

[11] 4,446,509

[45] May 1, 1984

[54] FLASHLIGHT WITH COMPASS MEANS INTEGRAL THERETO

[76] Inventor: Charles E. Thomas, 36954 Sugar Ridge Rd., North Ridgeville, Ohio 44039

[21] Appl. No.: 451,247

[22] Filed: Feb. 28, 1983

[51] Int. Cl.$^3$ ............................................. F21V 33/00
[52] U.S. Cl. .................................... 362/184; 362/200; 362/205; 362/227; 362/228; 362/234; 362/251; 362/253; 362/295
[58] Field of Search ............... 362/184, 200, 205, 227, 362/228, 234, 251, 253, 295

[56] References Cited

U.S. PATENT DOCUMENTS

| | | | |
|---|---|---|---|
| 980,730 | 1/1911 | Wyatt | 33/355 |
| 1,506,303 | 8/1924 | Hopkins | 362/253 X |
| 1,923,531 | 8/1933 | Florez | 240/6.41 |
| 2,237,963 | 4/1941 | Hawks | 362/29 X |
| 3,816,936 | 6/1974 | Parson, Jr. | 33/355 |

*Primary Examiner*—Stephen J. Lechert, Jr.
*Attorney, Agent, or Firm*—Gustalo Nunez

[57] ABSTRACT

A portable hand held battery operated flashlight having mounted thereon, a magnetic compass which receives illumination from the flashlight or which may have its own illuminating means. The compass is mounted such that compass readings may be taken by the holder of the flashlight whenever the flashlight is illuminated.

1 Claim, 3 Drawing Figures

FLASHLIGHT WITH COMPASS MEANS INTEGRAL THERETO

BACKGROUND OF THE INVENTION

This invention relates to a hand held flashlight having magnetic compass means attached thereto. The flashlight when in an on condition will cause the compass face to be illuminated which enables the owner to be able to read the compass and thus determine the direction in which the holder is traveling. This invention will also enable the holder to obtain his bearings because when the light is on, the light beam will be projected to some target in which the holder is heading which can then be pin-pointed by a simple compass reading.

This invention will enable night hunters to get to where they want to go as expeditiously as possible. This invention may also be used by those in the military for practise in navigation and compass reading. Further, the invention obviates the necessity of what has been true in the past, and that is, carrying a flashlight in one hand, and a compass in the other. This ties both hands thereby limiting the flexibility of the holder.

Further, by having the compass and light separate as in the past, the compass is more prone to be damaged.

DESCRIPTION OF THE PRIOR ART

Various efforts have been made in the past to develop devices which include the use of a compass means. The U.S. Pat. to Parson, Jr., No. 3,816,936 is directed to a compass bearing attachment for binoculars, which is produced as a separate entity capable of use with existing binoculars of conventional construction, and which has primarily mechanical means for providing a temporary or momentary readout or indication of the compass bearing of the binoculars at the the time the binoculars are accurately centered on the target in the field of view.

The U.S. Pat. to Florez, No. 1,923,531 discloses a gun with an electric light attached thereto. The light is used to direct the user to his target. This helps the holder improve his aim and also minimizes the use of ammunition in practise.

The U.S. Pat. of Wyatt, No. 980,730 relates to a combined compass and tape line, so assembled as to provide a simple and convenient appliance to locate and lay out mining claims and trace lines in general, thus providing for certain work a substitute for a transit.

The invention in a general way consists of a casing having a compass at the top and a tape line arraged below or around the compass, the easing being further provided with sights in diametrical alinement therewith to direct the lineman in the proper course.

SUMMARY OF THE INVENTION

The invention as contemplated herein consists of a hand held electric flashlight integrated with a magnetic compass means. The inventions solves a long standing problem experienced by night travelers, sportsmen, hunters, military men and those who adventure for adventures sake. In the past, when night traveling, one would have the compass in his pocket and a light in his hand. In order to obtain navigational bearing, the user would have to withdraw the compass from his pocket and illuminate it with the flashlight inorder to get a reading. This not only was cumbersome, but placed the compass in a position where it could be damaged while in the pocket or when being removed from the pocket. It also required the use of both hands, thus restraining the flexibility of the user.

The invention as thought by the inventor herein discloses a hand held light with a magnetic compass integrated thereto, such that whenever the light is illuminated, the compass is likewise illuminated so the holder thereof can see the direction of the light beam simultaneous with the compass points of the compass thereby enabling him to navigate in the darkness and also enabling the user to have one hand free.

The invention as contemplated is a hand held light molded of some shock-resistant and electrical insulating material such as plastic, for example, a material such as polyethylene. The light would be molded such that provisions are made for receiving a magnetic compass.

DETAILED DESCRIPTION OF THE PREFERRED EMBODIMENT

Figure 1:
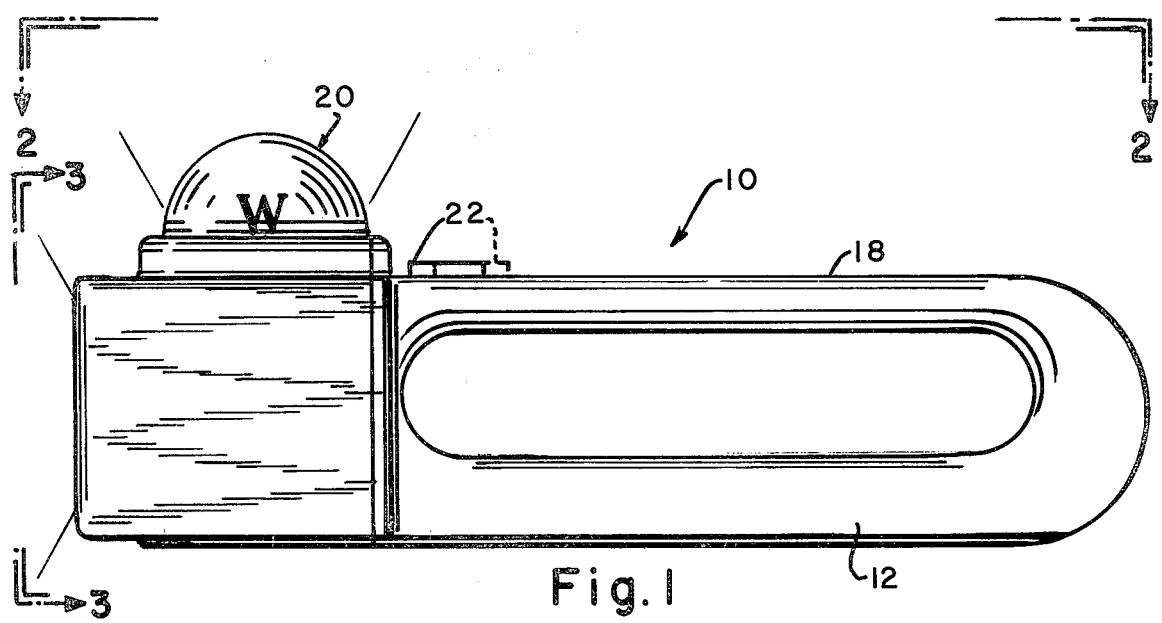
FIG. 1 is a side elevation view of the flashlight and compass in accordance with this invention.
Figure 2:
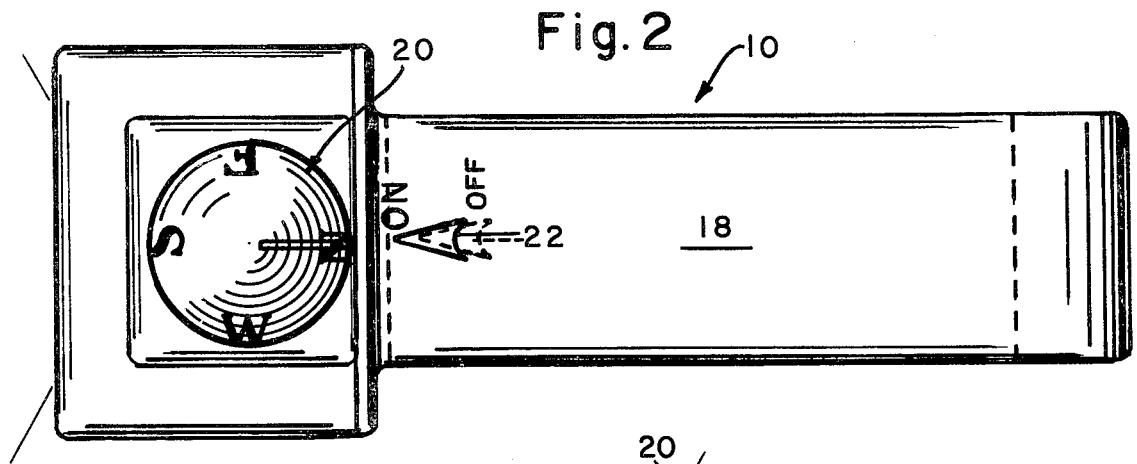
FIG. 2 is a top elevation view taken along lines 3—3.
Figure 3:
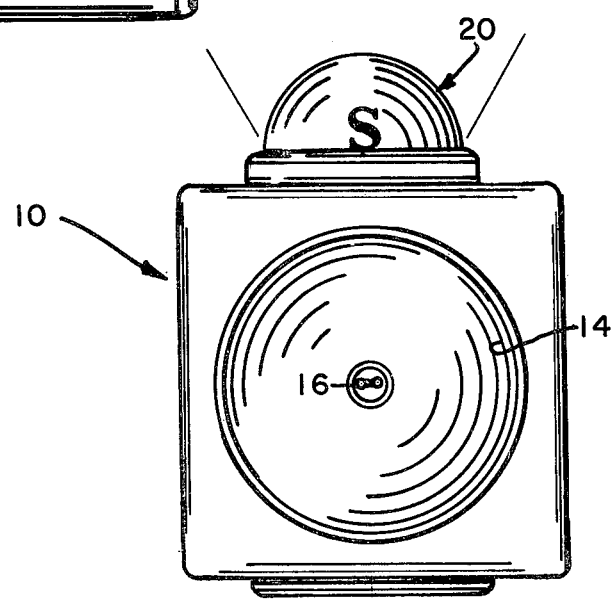
FIG. 3 is a front elevation view taken along lines 3—3.

The embodiments of FIGS. 1-3 illustrate a hand held flashlight and a magnetic compass as one integrated unit 10, having a body molded of a shock resistant plastic material such as polyethelene which also has excellent electrical insulating characteristics. The light body includes a battery chamber 12, a cavity for holding a lens support bell 14, a bulb 16 and handle 18. The light body further includes a magnetic compass 20 of the general type embodying a fluid immersed compass float. The compass is fitted into an open chamber located at the top of the flashlight, the chamber being such that the compass body makes an integral connection with the flashlight body 10. This compass of the general type has a fixed reference or sights line (not shown) which would face the user and which would be in a plane parallel to the light beam emitted by the flashlight. This compass would also include internally, a light emitting bulb, not shown, which would be illuminated simultaneously with the flashlight. Therefore, whenever the flashlight 10 is on, the compass face 20 would be illuminated. Similarly, the compass could be equiped with a light emitting diode, known as L.E.D., which could be powered by the flashlight batteries whenever the flashlight is on thus providing sufficient illumination on the compass face for the user to read. The light emitting bulb in the compass would generally be connected in parallel to the battery power supply.

The chambers for the lens bell 14 and the compass 20 are not shown since they may be conventionally made.

The body of the flashlight is also provided with a switch 22 for turning on the flashlight and compass. The contacts associated with the switch 22 would be in series connection with the light filaments of the bulb 16 and the light emitting source associated within the compass 20.

From the description given above, it can be seen that many possible variations and modifications of the invention are suggested, which would not depart from its spirit and scope. Therefore, it is understood that the invention is not limited in its application to the details described or illustrated herein. Accordingly, it is to be understood that the foregoing description is illustrative only, rather than limiting. This invention is limited only by the scope of the following claims.

What is claimed:
1. A combination of the class described involving an electric flashlight and magnetic compass, comprising:
   a body structure preinjection molded from a material have shock resistant and electrical insulating characteristics;
   an elongated tubular cavity for receiving a plurality of batteries;
   a second cavity adopted to receive a bell type lens and a light emitting bulb;
   a magnetic compass including an internal light emitting source connected in series with said light emitting bulb, said compass position forward of said body structure and having a line of sight parallel to a light beam emitted by said light emitting bulb;
   switch means for connecting said light emitting bulb and said light emitting source in series with said batteries; and
   said body structure further defining handle means for holding said flashlight, said handle means and battery container being one continuous U-shaped tube.

* * * * *